(12) United States Patent
Gao et al.

(10) Patent No.: US 12,531,308 B2
(45) Date of Patent: Jan. 20, 2026

(54) ELECTRIFIED VEHICLE BATTERY PRESSURE RELIEF STRUCTURE

(71) Applicant: FORD GLOBAL TECHNOLOGIES, LLC, Dearborn, MI (US)

(72) Inventors: Fei Gao, Hefei (CN); Bin Yin, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 986 days.

(21) Appl. No.: 17/669,070

(22) Filed: Feb. 10, 2022

(65) Prior Publication Data

US 2022/0278419 A1   Sep. 1, 2022

(30) Foreign Application Priority Data

Feb. 26, 2021   (CN) .......................... 202120441829.0

(51) Int. Cl.
  *H01M 50/30*   (2021.01)
  *F16K 15/14*   (2006.01)
(52) U.S. Cl.
  CPC ......... *H01M 50/394* (2021.01); *F16K 15/148* (2013.01); *H01M 2220/20* (2013.01)
(58) Field of Classification Search
  CPC ............ H01M 50/394; H01M 2220/20; F16K 15/148; F16K 15/0209
  See application file for complete search history.

(56) References Cited

U.S. PATENT DOCUMENTS

| 7,579,105 B2 | 8/2009 | Yoppolo et al. |
| 2006/0188779 A1 | 8/2006 | Yoppolo et al. |
| 2007/0193649 A1 * | 8/2007 | Podd ...................... B65D 88/62 141/67 |
| 2014/0053929 A1 * | 2/2014 | Zheng ................... F16K 15/148 137/614.19 |
| 2016/0036025 A1 | 2/2016 | Hofer |
| 2016/0327171 A1 * | 11/2016 | Seidl ..................... F16K 15/025 |
| 2019/0178401 A1 | 6/2019 | Zaggl et al. |

FOREIGN PATENT DOCUMENTS

| CN | 103762324 A | * | 4/2014 | .......... H01M 2/1241 |
| CN | 209262360 U | * | 8/2019 | ............... F16K 1/32 |
| WO | WO-2020085210 A1 | * | 4/2020 | ........... F16K 15/148 |

OTHER PUBLICATIONS

CN 209262360 U Machine Translation (Year: 2019).*
WO 2020085210 A1 Machine Translation (Year: 2020).*
CN-103762324-A Macine Translation (Year: 2014).*

* cited by examiner

*Primary Examiner* — Jennifer Dieterle
(74) *Attorney, Agent, or Firm* — Brooks Kushman PC; David B. Kelly

(57) ABSTRACT

A pressure relief structure for an electrified vehicle battery pack includes a valve body having a first end and a second end, and a through hole extending between the first end and the second end, a breathable membrane extending across the first end of the valve body, and a valve cover covering the breathable membrane and having fluid passages that couple the through hole to atmosphere. The valve cover include a protrusion configured to engage a first tool, and a cavity in the protrusion configured to engage a second tool. A flange structure disposed between the first end and the second end extends circumferentially and forms a secondary fluid flow path.

14 Claims, 3 Drawing Sheets

ELECTRIFIED VEHICLE BATTERY PRESSURE RELIEF STRUCTURE

CROSS-REFERENCE TO RELATED APPLICATIONS

This application claims foreign priority benefits under 35 U.S.C. § 119(a)-(d) to CN Application 2021 204 418 290 filed Feb. 26, 2021, which is hereby incorporated by reference in its entirety.

TECHNICAL FIELD

The present disclosure relates to an electrified vehicle battery pack pressure relief valve that facilitates battery pack pressure testing with the valve installed.

BACKGROUND

It is well-known that pressure relief valves can be used for pressure exchange between closed containers and atmosphere to achieve a desired pressure balance. The pressure relief valves have various structures and various application scenarios. With the rapid development of electrified vehicles due to their advantages in reducing fuel consumption and emissions, typical electrified vehicles include battery packs, and the application of pressure relief valves on the battery packs is also common.

There are various pressure relief valve configurations in the prior art. For example, patent application US20160036025 discloses a pressure relief valve for a housing of a battery, which includes a support element, a breathable and waterproof membrane, and a tensioning frame that presses the breathable and waterproof membrane against the support element. Spring elements on the tensioning frame further restrict the movement through a cover.

Inventors of the present disclosure have realized that the stability and durability of the pressure relief valve structure and its connection structure with the battery pack can be further optimized, so as to solve one or more problems existing in the prior art. As one example, many pressure relieve valves of the prior art require that battery pack pressure testing be completed prior to valve installation, or that the valve be removed to perform a pressure test.

SUMMARY

In view of the problems existing in the related art, a pressure relief valve with a compact structure for easy installation and testing, and a battery pack including the pressure relief valve are provided.

According to an aspect of the present disclosure, a pressure relief valve is provided, that comprises: a valve body having a first end and a second end, and a through hole extending through the first end and the second end; a breathable membrane connected to the first end of the valve body; and a valve cover covering the breathable membrane and having breathing passages; wherein the valve body includes a flange structure between the first end and the second end.

The flange structure may include a rim portion with a size larger than a size of the valve cover. The valve body may comprise a support portion located on a first side of the flange structure for connecting the breathable membrane, and a connecting portion located on a second side of the flange structure, and wherein the supporting portion, the connecting portion and the flange are integrally formed. The support portion may include a first support portion configured to be breathable, a second support portion that smoothly transitions around the first support portion, and a third support portion surrounding the second support portion and having air flow passages leading to outside of the valve body. The breathable membrane may be generally abutted against the first support portion and the second support portion and connected to the third support portion in a first state; and the breathable membrane is relatively separated from the first support portion and the second support portion to form a direct flow passage in a second state. The first end of the valve body may have a mesh support frame supporting the breathable membrane, and the second end may be connected with a protective cover having a plurality of through holes. The breathable membrane may be welded to the support portion by a welding ring. The second side of the flange structure may have a sealing groove surrounding but spaced from the connecting portion, in which a sealing ring is located partially. The connecting portion of the valve body may be formed as a cylinder and may have an external thread structure. The sealing ring may have a plurality of spaced protruding ribs thereon. The passages that allow gas to pass through may be formed between the flange structure and the valve cover. An air flow passage may be formed between the flange structure and the support portion. The valve cover may have an outer protrusion configured to engage a first tool, and the outer protrusion may include a groove configured to engage a second tool.

According to another aspect of the present disclosure, a battery pack is provided that includes the pressure relief valve as previously described.

The above and other advantages and features of the present disclosure will become apparent from the following detailed description alone or in conjunction with the accompanying drawings.

For a better understanding of the present application, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like reference numbers refer to like parts throughout the different figures, in which:

DETAILED DESCRIPTION

Figure 1:
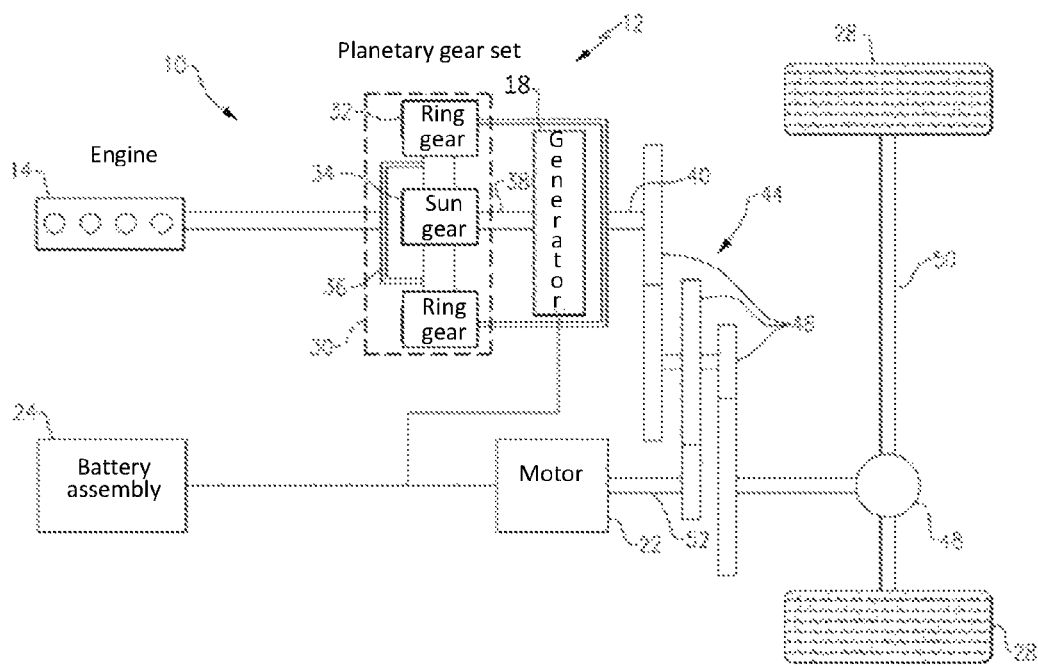
FIG. 1 shows an electrified vehicle having a battery pack or assembly with a pressure relief structure according to this disclosure.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Embodiments of the present disclosure will now be described in detail with reference to the accompanying drawings. For reference numbers in the drawings, the same or similar reference numbers are used to designate the same or similar parts. In the following description, various operating parameters and components are described in various embodiments. These specific parameters and components are included herein by way of example only and are not meant to be limiting.

In this document, relational terms, such as first and second and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or", when used in a list of two or more items, means that any one of the listed items can be employed by itself, or any combination of two or more of the listed items can be employed.

As mentioned in the background, pressure relief valves can be used for pressure exchange between closed containers and outside to achieve a desired pressure differential across the valve. With the rapid development of electrified vehicles due to their advantages in reducing fuel consumption and emissions, the pressure relief valves are commonly used on battery packs to facilitate sealing of battery packs and gas exchange at different rates under different pressures. Currently, there are various designs of the pressure relief valves, and the inventors of the present disclosure believe that there is further room for improvement in the pressure relief valve, especially the pressure relief valve for battery packs. In one or more embodiments, the inventors of the present disclosure propose a pressure relief structure that may have one or more advantages of structural robustness, connection convenience, and testing convenience, for example.

Referring to FIG. 1, one example of an electrified vehicle 12 having a battery pack with a pressure relief structure according to the present disclosure is shown, Although depicted as a hybrid electric vehicle (HEV), it should be understood that the battery pack according to the present disclosure may be used in other types of plug-in deep hybrid electric vehicles (PHEVs), pure electric vehicles (BEVs), full hybrid electric vehicles (FHEVs), etc.

In one embodiment, a powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly. In this example, the second drive system is considered an electric drive system of the powertrain 10. The first and second drive systems generate torque to drive one or more sets of vehicle drive wheels 28 of the electrified vehicle 12. Although a power-split configuration is shown in this illustrative embodiment, this disclosure extends to any hybrid electric vehicle including full hybrids, parallel hybrids, series hybrids, mild hybrids or micro hybrids. The engine 14 and the generator 18 may be connected through a power transfer unit 30. In addition to planetary gear set, other types of power transfer units may be used to connect the engine 14 to the generator 18. In a non-limiting embodiment, the planetary gear set includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The battery pack/assembly 24 is an example type of battery assembly for an electrified vehicle. The battery pack/assembly 24 may provide power to drive a motor, and in regenerative braking, the motor 22 and generator 18 may output power to the battery pack/assembly 24 for storage. The battery pack/assembly 24 may include a high voltage battery pack, which may include a plurality of battery arrays. In the following embodiments, battery packs that can be incorporated into the above-described example electrified vehicles are provided.

Figure 2:
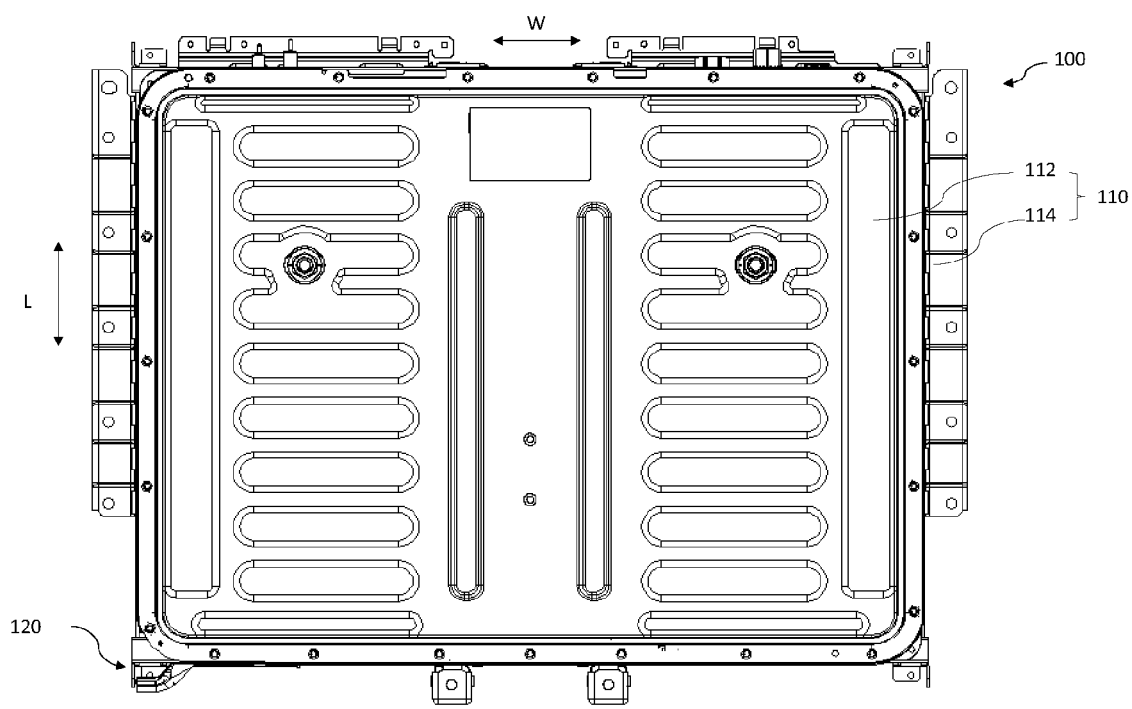
FIG. 2 shows a top view of a battery pack 100 that may be incorporated into an electrified vehicle as generally represented in FIG. 1.

FIG. 2 is a top view of a battery pack 100 that may be incorporated into the above-described electrified vehicle. As shown in the figure, the battery pack 100 includes a housing 110 composed of an upper cover 112 and a lower tray 114, and a plurality of reinforcing structures and connection positions can be provided around the housing 110, which are omitted here for brevity and will not be marked and described one by one. To facilitate the description of the embodiments below, a first direction along the vehicle, such as a width direction of the vehicle, is marked as W and a second direction along the vehicle, such as a longitudinal direction of the vehicle, is marked as L. The height direction of the battery pack 100 is not shown in this top plan view. The battery pack 100 is generally communicated with outside air through an air guide device 120, and a pressure relief valve connected to the battery pack is included below the air guide device 120. It can be understood that, in other embodiments, the pressure relief valve can be directly connected to the battery pack without an additional air guide device. The construction of the pressure relief valve will be explained below with reference to further drawings.

Figure 3:
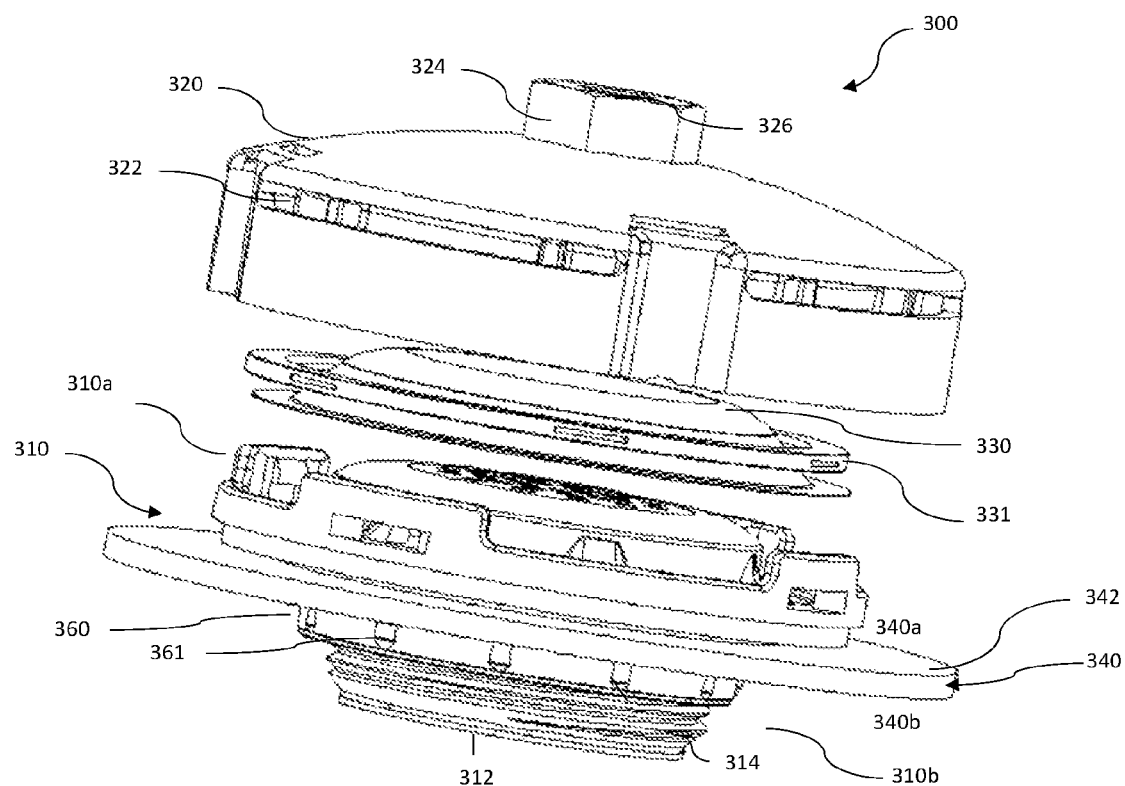
FIG. 3 shows a pressure relief structure configuration that can be used in a vehicle battery pack.
Figure 4:
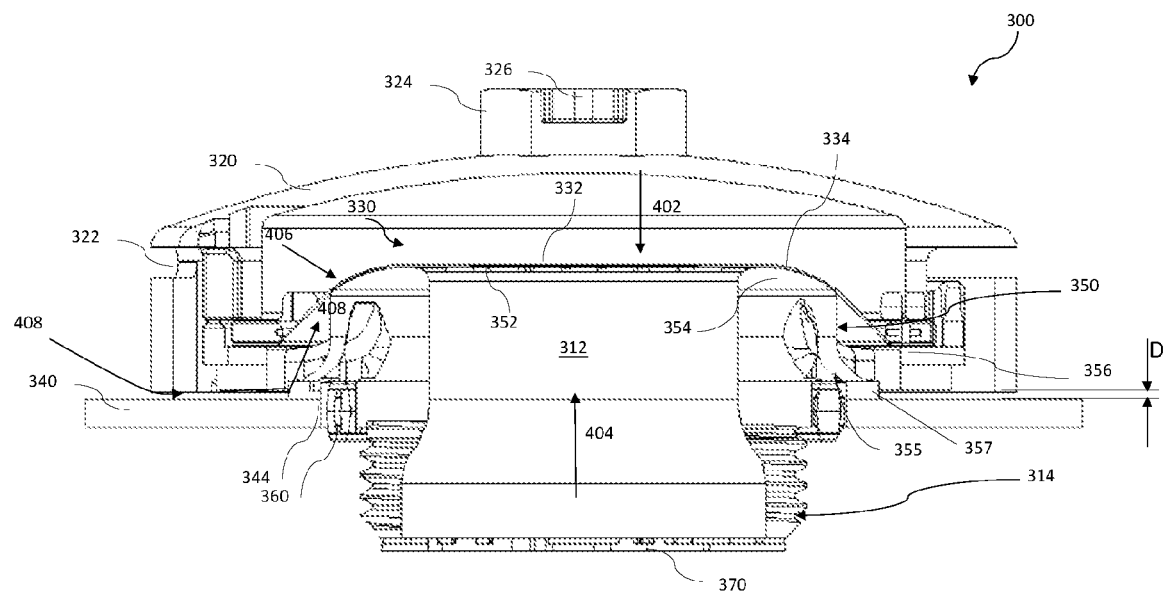
FIG. 4 shows a cross-sectional view of the pressure relief structure shown in FIG. 3.

FIG. 3 is an embodiment of a pressure relief structure that can be used in the battery pack according to the present disclosure, and FIG. 4 is a cross-sectional view of the embodiment shown in FIG. 3. It should be understood by those skilled in the art that although the pressure relief valve structure is discussed in the context of being used in battery packs, various pressure relief valves can be applied in any suitable situations where it is necessary to maintain pressure balance inside and outside a container.

As shown in FIG. 3, in one or more embodiments, a pressure relief valve 300 is provided. The pressure relief valve 300 generally includes an axially extending valve body 310 and a valve cover 320 that cooperates with the valve body 310. The valve body 310 has a first end 310a and an opposite second end 310b, and the valve body 310 further includes a through hole 312 formed through the first end 310a and the second end 310b for gas exchange. In the described non-limiting embodiment, the first end 310a of the valve body 310 is connected with a breathable membrane 330 that may have the property of being breathable but waterproof. Depending on the sealing requirements, a suitable waterproof and breathable membrane on the market can be selected. In one or more embodiments, the breathable membrane 330 is connected to the valve body 310 by welding, bonding or suitable means, for example, the breathable membrane 330 is connected to the valve body 310 by a welding ring 331 in the illustrated embodiment. In the depicted embodiment, the valve cover 320 generally covers the breathable membrane 330 for protection. The valve cover 330 itself may have breathing passages configured for gas exchange, such as the grooves or through holes 322 shown in the figure, and the valve cover 320 may be connected to the valve body 310 by snaps or other suitable structures. In one or more embodiments, the valve body 310 includes a circumferentially extending flange structure 340 located between the first end 310a and the second end 310b. The flange structure 340 is generally annular and planar, and may have relatively smooth surfaces to facilitate mating of the connecting surfaces. It will be understood by those skilled in the art that the flange structure may also have other structural variations depending on the surfaces to be joined in the application. In the depicted embodiment, the flange structure 340 has a rim portion 342 with a size larger than a size of the valve cover 320, to allow connection with test equipment during airtightness experiments. The construction of the valve and the function of the flange structure will be further described below with reference to the accompanying drawings.

With further reference to FIG. 3, to install the pressure relief valve 300, at the second end 310b of the pressure relief valve 300, a connecting portion 314 may extend from the flange structure 340, which may have an external thread structure and thus be configured for connection to a complementary threaded aperture. In the depicted embodiment, the flange structure 340 and the connecting portion 314 can be integrally formed. In one embodiment, the pressure relief valve 300 can be directly connected to the battery pack through the connecting portion 314, and the flange structure 340 is located outside of the housing of the battery pack. For the convenience of description, the side of the flange structure 340 facing the valve cover 320 is marked as a first side 340a, and the side of the flange structure 340 facing the component to be connected is marked as a second side 340b. In another embodiment, for better sealing, the second side 340b of the flange structure 340 has a sealing groove 344 (shown in FIG. 4) surrounding but spaced apart from the connecting portion 314, in which a sealing ring 360 is located at least partially. The sealing ring 360 is spaced apart from the connecting portion 314 to prevent edge of the connecting portion 314 or the through hole of the component to be connected from being squeezed and damaging the sealing ring 360 during installation. The groove 344 helps to stabilize the positioning of the sealing ring 360, and the sealing ring 360 achieves a stable sealing against the surface to be connected. In the depicted embodiment, the sealing ring 360 also has a plurality of spaced protruding ribs 361 to achieve a stable fit in the grooves 344. In one embodiment, in order to install the pressure relief valve 300 on a component to be connected, such as to install on a battery pack, the valve cover 320 is provided for ease of installation. As shown in FIG. 3, the valve cover 320 has an outer protrusion 324 configured to engage a first tool, e.g., operable with a wrench. In addition, a groove 326 for engaging a second tool is formed within the outer protrusion 324, e.g., operable with other tools such as a different hex wrench.

FIG. 4 shows a cross-sectional view of the pressure relief valve 300 in the embodiment of FIG. 3. With continued reference to FIG. 3 in conjunction with FIG. 4, in one or more embodiments, the valve body 310 includes a support portion 350 located on the first side of the flange structure 340 for connecting the breathable membrane 330, and the above-mentioned connecting portion 314 located on the second side of the flange structure 340. In the depicted embodiment, the flange structure 340, the support portion 350 and the connection portion 314 may be integrally formed. Further, the support portion 350 may provide an area for connecting with the breathable membrane 330 and may be flanged around the outer ring of the breathable membrane 330 so as to be connected with the valve cover 320. In the depicted specific embodiment, the support portion 350 further includes a first support portion 352 that is located in the center of the valve body 310 and generally corresponds to the position of the through hole 312, and is configured to be breathable, a second support portion 354 that smoothly transitions around the first support portion 352, and the third support portion 356 around the second support portion 354 and with an air flow passage leading to the outside of the valve body.

Continuing to refer to the drawings, in a specific embodiment, the first support portion 352 of the pressure relief valve 300 is formed to have a perforated support frame for supporting the breathable membrane 330, and the mesh support frame has a plurality of through holes. When the breathable membrane 330 moves under the action of air pressure, the support frame can provide support for the breathable membrane 330, so as to avoid excessive movement of the breathable membrane 330 and possible damage. In the depicted embodiment, using the flange structure 340 as a reference plane, the first support portion 352 generally has a first height, and the third support portion 356 has a second height, wherein the first height is greater than the second height. The second support portion 354 has a height between the heights of the first support portion 352 and the third support portion 356 to form a smoother transition. The difference in height and the design of the second smooth support portion enable the breathable membrane 330 to be connected to the support portion 350 with a certain tension, and obtain sufficient support and achieve the effect of bidirectional ventilation under normal pressure and rapid ventilation under high pressure. The portion of the breathable membrane 330 between the second support portion 354 and the third support portion 356 is in contact with the outside air above and below the breathable membrane 330, and can maintain a dynamic airflow balance under normal pressure. It will be further explained below in conjunction with the accompanying drawings.

After the pressure relief valve 300 is installed on the component to be connected, for example, after installed on the battery pack, in a first state where the air pressure difference between the two sides of the breathable membrane 330 is less than a threshold value, the breathable membrane 330 is generally abutted against the first support portion 352 to form a first zone for slow breathability, and generally abutted against the second support portion 354 to form a supportive and relatively sealed second zone 334, and the breathable membrane 330 is attached to the third support portion 356. In the depicted embodiment, the breathable membrane 330 is welded to the third support portion 356 by a welding ring 331. As shown in FIG. 4, in the first zone 332, as indicated by arrows 402 and 404, the gas exchanged from the central through hole and the first zone 332 reaches equilibrium under normal gas pressure.

Continuing to refer to FIGS. 3 and 4, in the depicted embodiment, the third support portion 356 has a passage for direct gas exchange with the environment outside the pressure relief valve 300, as indicated by an arrow 408. In other words, under normal pressure, breathing passages are formed on the third support portion 356 itself and/or between the third support portion 356 and the flange structure 340, so that a part of the gas can directly pass through the first side 340a of the flange structure 340, enters the pressure relief valve 300 from the third support portion 356 and is located below the breathable membrane 330. Likewise, the gas can enter the valve cover 320 and be located above the breathable membrane 330 as indicated by an arrow 406. Here or at other positions, "above" and "below" of the breathable membrane 330 are used for the convenience of description, and do not indicate an absolute position after installation. "Above" and "below" indicate relative positions, above may indicate the side closer to the valve cover 320, and below may represent the side closer to the component to be connected. Under normal air pressure, the air pressures shown by the arrows 406 and 408 are in dynamic equilibrium. In a second state where the air pressure difference between the two sides of the breathable membrane 330 reaches the threshold value, no matter which side of the pressure is too large, the breathable membrane 330 will bulge, so that the breathable membrane 330 is relatively separated from the first support portion 352 and the second support portion 354 to form a direct flow passage for air.

In a specific embodiment, with continued reference to FIG. 4, the second support portion 354 is supported on the flange structure 340 by one or more support arms 355. The second support portion 354 has a base portion 357 proximate to the flange structure, wherein the base portion 357 and the support arms 355 are at least partially away from, or in other words do not contact, the breathable membrane 330. The third support portion 356 extends from the second support portion 354 near the position between the support arms 355 and the base portion 357, and forms a first gap D with the flange structure. In other words, the third support portion 356 does not contact the flange structure 340 at least in part. The third support portion 356 has an opening leading to the first gap D, so that air can enter the position below the breathable membrane 330 from the first gap D through the opening of the third support portion 356. It can be understood that an air inflow opening can also be formed on the second support portion 354, as long as the air can enter the position below the breathable membrane 330. In addition, those skilled in the art should understand that the flange structure 340, the first support portion 352, the second support portion 354, and the third support portion 356 do not have clear boundaries. This division is only for the convenience of illustration, and the division of position is not absolute, nor does it mean division of components. On the contrary, in one or more embodiments, these parts may be integrally formed.

In another embodiment, the connection between the welding ring 331 and the breathable membrane 330 may also be discontinuous, thereby allowing the formation of a plurality of circumferentially separated passages that do not pass through the breathable membrane 330 but allow the air to directly flow under a certain pressure, These alternative passages can replace the breathing passages between the third support portion 356 and the outside, and can also be used as supplements for the breathing passages between the third support portion 356 and the outside. In general, the second support portion 354 is formed with a smooth transition, so that the breathable membrane 330 will not be damaged due to sharp edges when installed and used.

Continuing to refer to FIG. 4, in a specific embodiment, the second end 310b of the valve body 310 is connected with a protective cover 370 having a plurality of through holes. A protective cover 370 may be formed at an end of the second end 310b, or may be located in the passage. It can be understood that, for example, when the battery pack is connected to the valve body 310, the protective cover 370 can prevent foreign objects from entering and blocking the valve body. In one embodiment, the size of the through hole or opening on the protective cover 370 is larger than that of the above-mentioned support frame of the first support portion 352.

The gas flow path is described further below with reference to FIGS. 4 to 5B. As shown in FIG. 4, when the gas pressure difference between the two sides of the pressure relief valve 300 is below the threshold value, gas can be exchanged on both sides of the breathable membrane 330 as shown in the figure, such as in the first zone 332, gas flow path is shown by a gas inflow arrow 402 and a gas outflow arrow 404. Further, gas exchange may also occur as indicated by the arrows 406, 408. In a specific example, for example, when the ambient pressure is 1.8 KPa, the airflow on both sides of the pressure relief valve 300 allows a flow rate of 0.95 L/min.

Figure 5A:
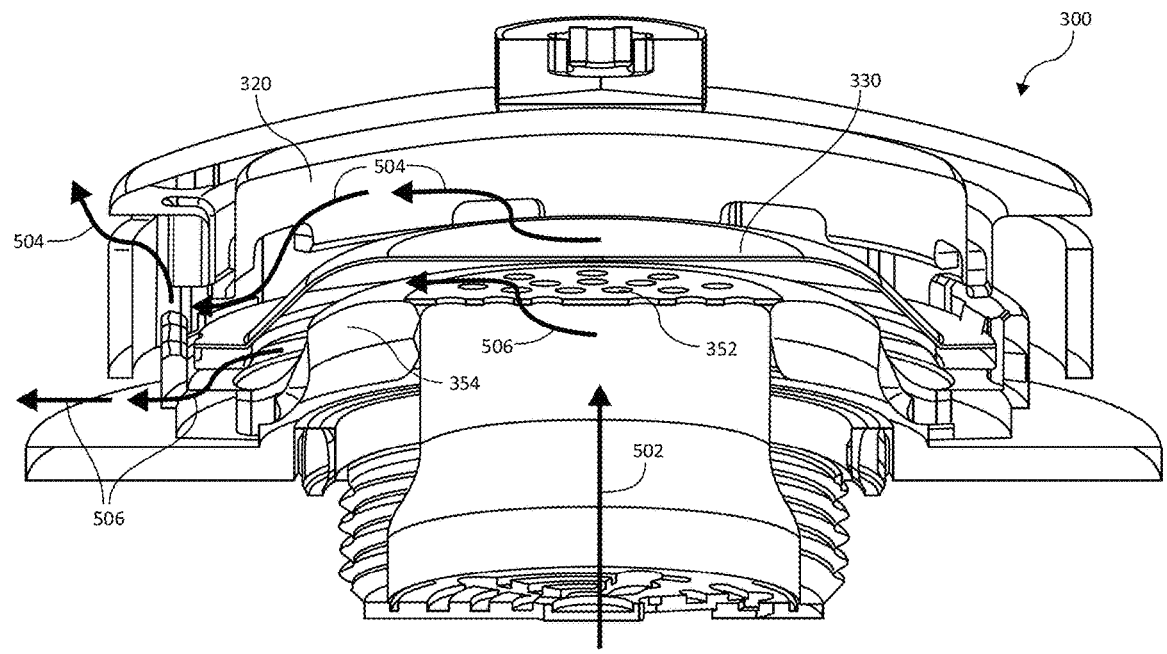
FIGS. 5A and 5B illustrate gas flow through a representative embodiment of a pressure relief structure.

Referring to FIG. 5A, an air flow state when the internal air pressure of the pressure relief valve 300 exceeds the external air pressure is shown. When the difference between the internal air pressure of the pressure relief valve 300 and the external air pressure is greater than the threshold value, as shown in FIG. 5A, under the pressure of the airflow 502 in the pressure relief valve 300, the air exchange rate of the breathable membrane 330 of the pressure relief valve 300 cannot meet the gas exchange requirement, so the breathable membrane 330 is forced to bulge in the direction of the valve cover 320 under the action of pressure, so as to be separated from the first support portion 352 and the second support portion 354. In other words, gaps are generated between the first support portion 352, the second support portion 354 and the breathable membrane 330. During this process, a part of the gas passes through the breathable membrane 330 as indicated by arrows 504 and exits from the fluid passage on the valve cover 320. The other part of the gas directly does not pass through the membrane 330 as shown by arrows 506, and is directly discharged as shown by the arrows 506, so as to achieve the purpose of rapidly releasing the pressure under high pressure. In one specific example, when the pressure within the pressure relief valve 300 reaches 5 KPa, the pressure relief valve 300 allows a gas flow rate of up to 30 L/s.

Figure 5B:
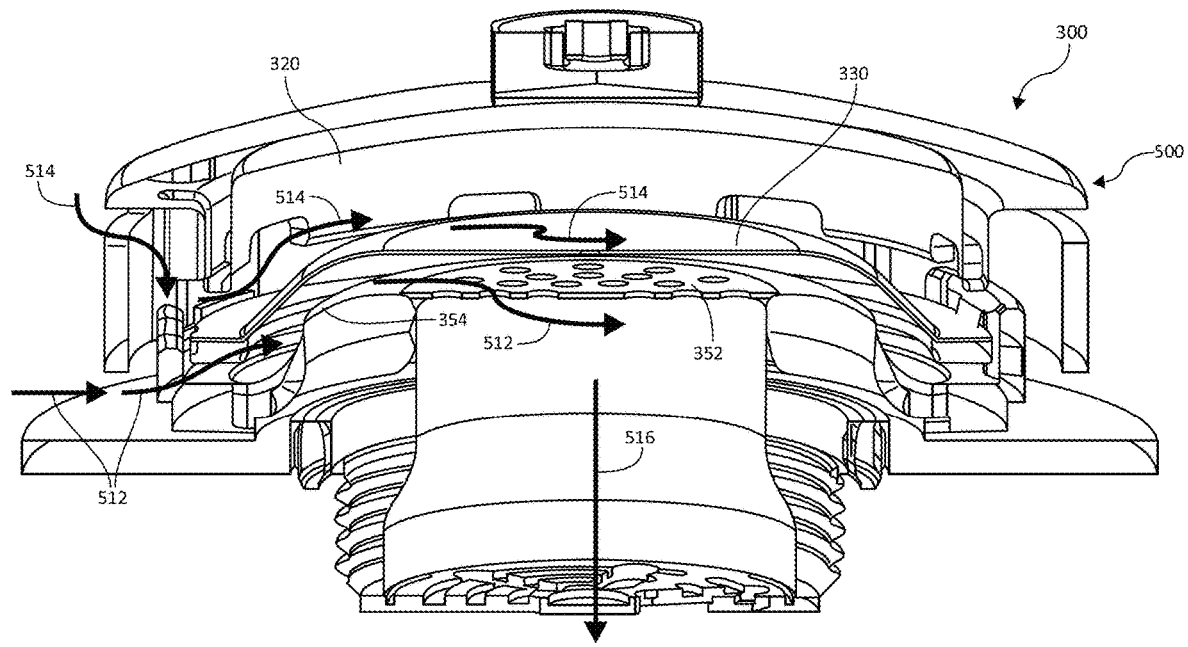

When the difference between the external air pressure and the internal air pressure of the pressure relief valve 300 is above a threshold value, as shown in FIG. 5B, external gas flow, as indicated by arrows 512 and 514, enters locations above and below the breathable membrane 330. For example, a part of the gas shown by the arrow 514 may pass through the breathable membrane 330 on the one hand, and escape through other fluid passages of the valve cover 320 on the other hand. It will be appreciated that the arrows 512 and 514 are for illustration and not limitation, and in fact, gas exchange will always occur above and below the breathable membrane 330. When the difference between the external gas pressure and the pressure inside the pressure relief valve 300 is greater than the set threshold value, a large amount of airflow enters the valve 300 along the arrows 512, as a result, the breathable membrane 330 can be lifted due to the pressure, so that the breathable membrane 330 is separated from the second support portion 354 and the first support portion 352, thereby forming a flow passage for rapid airflow into the valve 300 as shown in FIG. 5A.

In a specific embodiment, when the pressure relief valve 300 is installed to the battery pack, through a detection protection cover 500 as shown and an inflation passage (as shown by the arrow 512) provided on the detection protection cover 500, gas can be quickly charged into the interior of the battery pack along the airflow direction indicated by an arrow 516 to complete a tightness test. In one specific example, the pressure relief valve 300 allows gas flow rates of up to 50 L/min when the external inflation pressure is 3 KPa. Since the air flow passage of the valve 300 is located above the flange structure 340, and the detection protection cover 500 can be directly located on the flange structure 340, the installation is convenient, and it is not necessary to completely wrap the valve 300, so the tightness at the sealing ring 360 can be detected more easily. In the prior art, when testing the tightness of the battery pack, it is often necessary to remove the pressure relief valve first, and perform inflation and tightness test on the battery pack through the opening for valve installation. However, when the pressure relief valve is installed on the battery pack again, it is difficult to confirm the tightness of the battery pack after the valve body is installed. Moreover, even if the valve in the prior art is sealed by a sealing sleeve and then tested, it is difficult to detect the tightness of the sealing ring.

In the embodiments of the present disclosure, through the design of the passage that communicates with the external air at some positions below the breathable membrane, the breathable membrane can be separated from the support structure so as to realize rapid gas exchange after the pressure difference between the inside and outside reaches a certain threshold value, which allows for easy external inflation during testing without removing the pressure relief valve. In addition, the smooth transition of the support portion makes the breathable membrane and the support portion fit more closely, and the durability can be further improved. The flange structure divides the seal of the valve body and the connection area into two parts, which can play the role of supporting the detection protection cover during the test process, and can easily distinguish the leakage position. One or more of the above-depicted embodiments provide a pressure relief valve, a battery pack including the same, and a vehicle. By optimizing the structure of the pressure relief valve, the convenience and accuracy of the pressure relief valve or the battery pack with the pressure relief valve during testing are further improved. Those skilled in the art can make various changes, modifications and variations to these specific embodiments without departing from the spirit and scope defined by the claims of the present disclosure.

Certain combinations and subcombinations regarded as novel and nonobvious are particularly pointed out in this application. Particular embodiments may refer to "a" element or a "first" element or similar features. Such descriptions should be understood to include one or more such elements, neither requiring nor excluding two or more such elements. Other combinations and subcombinations of the described features, functions, elements, and/or properties may be claimed through amendment of the current application or through presentation in this or a related application. Such claims, whether broader, narrower, equivalent, or different to the original claims, also should be regarded as included within the subject matter of this application. The above descriptions are only representative embodiments of the present disclosure, and are not intended to limit the present disclosure. For those skilled in the art, the present disclosure may have various modifications and changes. Any modification, equivalent replacement, improvement, etc. made within the spirit and principle of the present disclosure shall be included in the protection scope of the claimed subject matter.

While representative embodiments are described above, it is not intended that these embodiments describe all possible forms of the claimed subject matter. The words used in the specification are words of description rather than limitation, and it is understood that various changes may be made without departing from the claimed subject matter. Additionally, the features of various implementing embodiments may be combined to form further embodiments that may not be explicitly illustrated or described.

What is claimed is:

1. A pressure relief valve, comprising:
a valve body having a first end and a second end, and a through hole extending through the valve body between the first end and the second end;
a breathable membrane connected to the first end of the valve body; and
a valve cover covering the breathable membrane and having fluid passages;
wherein, the valve body includes an annular flange structure disposed between the first end and the second end, and wherein the valve body comprises a support located on a first side of the annular flange structure for connecting the breathable membrane, and a connecting portion located on a second side of the annular flange structure, and wherein the support further includes fluid passages leading to outside of the pressure relief valve configured to separate the breathable membrane from the support in response to a difference between external gas pressure and gas pressure inside the pressure relief valve exceeding a threshold pressure.

2. The pressure relief valve of claim 1, wherein the annular flange structure includes a rim portion having a circumference larger than a circumference of the valve cover.

3. The pressure relief valve of claim 1, wherein the support includes a first portion configured with a plurality of through holes, a second portion that smoothly transitions around the first portion, and a third portion surrounding the second portion and having fluid passages leading to outside of the valve body, the breathable membrane is generally abutted against the first portion and the second portion and connected to the third portion in a first state corresponding to a difference between gas pressure on opposite sides of the breathable membrane being less than or equal to the threshold pressure; and the breathable membrane is relatively separated from the first portion and the second portion to form a direct flow passage in a second state corresponding to the difference between gas pressure on opposite sides of the breathable membrane being greater than the threshold pressure.

4. The pressure relief valve of claim 3, wherein the breathable membrane is welded to the support of the first end of the valve body by a welding ring.

5. An electrified vehicle battery pack comprising the pressure relief valve of claim 3.

6. The pressure relief valve of claim 1, wherein the first end of the valve body has a mesh support frame for supporting the breathable membrane, and the second end of the valve body is connected with a protective cover having a plurality of through holes.

7. The pressure relief valve of claim 1, wherein the second side of the annular flange structure has a sealing groove surrounding but spaced from the connecting portion, the sealing groove configured to retain a sealing ring.

8. The pressure relief valve of claim 7, further comprising a sealing ring at least partially disposed within the sealing groove, the sealing ring having a plurality of spaced apart protruding ribs thereon.

9. The pressure relief valve of claim 1, wherein the valve cover has an outer protrusion shaped to engage a first tool, and wherein the outer protrusion includes a cavity shaped to engage a second tool.

10. The pressure relief valve of claim 1, wherein the annular flange structure includes a threaded connecting portion configured to engage a complementary threaded opening in an electrified vehicle battery pack.

11. A pressure relief structure for a vehicle battery pack, comprising:
    a valve body having an integrally formed planar annular flange structure with a first support portion comprising a perforated cover on a first side of the flange structure and a threaded connecting portion on a second side opposite the first side of the flange structure configured to engage a complementary threaded aperture of the battery pack, the valve body defining a central through hole extending from a first end to a second end of the valve body, the valve body including a non-perforated second support portion surrounding the first support portion, and a non-perforated third support portion surrounding the non-perforated second support portion and having fluid passages coupling the central through hole to atmosphere;
    a second cover having a plurality of through holes extending over the central through hole and connected to the second end of the valve body;
    a breathable membrane extending over at least the perforated cover of the first support portion and secured by a ring secured to the valve body; and
    a valve cover removably connected to the valve body and extending over the breathable membrane, the valve cover including a protrusion shaped to engage a first tool, the protrusion having a cavity shaped to engage a second tool;
    wherein the breathable membrane is configured to contacts the first support portion and the non-perforated second support in response to a difference between gas pressure on opposite sides of the breathable membrane being less than a first threshold pressure and is configured to separate from the first support portion and the non-perforated second support portion to form a flow passage between the central through hole and atmosphere in response to external gas pressure exceeding internal gas pressure by a predetermined amount in a second state.

12. An electrified vehicle battery pack comprising the pressure relief structure of claim 11.

13. The pressure relief structure of claim 11 wherein the flange comprise a sealing groove surrounding but spaced apart from the threaded connecting portion and configured to retain a sealing ring.

14. The pressure relief structure of claim 11 wherein the ring is welded to the valve body to secure the breathable membrane.

* * * * *